(12) United States Patent
Zhuang et al.

(10) Patent No.: US 7,707,129 B2
(45) Date of Patent: Apr. 27, 2010

(54) TEXT CLASSIFICATION BY WEIGHTED PROXIMAL SUPPORT VECTOR MACHINE BASED ON POSITIVE AND NEGATIVE SAMPLE SIZES AND WEIGHTS

(75) Inventors: Dong Zhuang, Beijing (CN); Benyu Zhang, Beijing (CN); Zheng Chen, Beijing (CN); Hua-Jun Zeng, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 369 days.

(21) Appl. No.: 11/384,889

(22) Filed: Mar. 20, 2006

(65) Prior Publication Data

US 2007/0239638 A1    Oct. 11, 2007

(51) Int. Cl.
*G06F 15/18* (2006.01)
*G06E 1/00* (2006.01)
*G06E 3/00* (2006.01)

(52) U.S. Cl. ............................................. 706/20
(58) Field of Classification Search .................. 706/20
See application file for complete search history.

(56) References Cited

U.S. PATENT DOCUMENTS 7,356,187 B2* 4/2008 Shanahan et al. ........... 382/224

OTHER PUBLICATIONS

Zhang, M. et al. "Robustness Enhancement for Proximal Support Vector Machines", in IEEE Information Reuse and Integration, 2004, pp. 290-295.*

Chu et al. "An Improved Conjugate Gradient Scheme to the Solution of Least Squares SVM," IEEE Trans. on NN, vol. 16, No. 2, pp. 498-501.*
Huang et al. "Weighted Support Vector Machine for Classification with Uneven Training Class Sizes", Proc. Of the 4th Intl. Conf. on Machine Learning and Cybernetics, 2005, pp. 4365-4369.*
Zhung et al. "Efficient Text Classification by Weighted Proximal SVM"ICDM'05.*
Baeza-Yates, Ricardo et al., Modern Information Retrieval, 1999, 38 pages, ACM Press, New York, USA.
Burges, Christopher J.C., A Tutorial on Support Vector Machines for Pattern Recognition, Data Mining and Knowledge Discovery, 1998, 43 pages, Kluwer Academic Publishers, Boston, USA.

(Continued)

*Primary Examiner*—Donald Sparks
*Assistant Examiner*—Liwu Chang
(74) *Attorney, Agent, or Firm*—Perkins Coie LLP (57) ABSTRACT

Embodiments of the invention relate to improvements to the support vector machine (SVM) classification model. When text data is significantly unbalanced (i.e., positive and negative labeled data are in disproportion), the classification quality of standard SVM deteriorates. Embodiments of the invention are directed to a weighted proximal SVM (WPSVM) model that achieves substantially the same accuracy as the traditional SVM model while requiring significantly less computational time. A weighted proximal SVM (WPSVM) model in accordance with embodiments of the invention may include a weight for each training error and a method for estimating the weights, which automatically solves the unbalanced data problem. And, instead of solving the optimization problem via the KKT (Karush-Kuhn-Tucker) conditions and the Sherman-Morrison-Woodbury formula, embodiments of the invention use an iterative algorithm to solve an unconstrained optimization problem, which makes WPSVM suitable for classifying relatively high dimensional data.

20 Claims, 9 Drawing Sheets

OTHER PUBLICATIONS

Fung, Glenn et al., Proximal Support Vector Machine Classifiers, 2001, 10 pages, KDD, San Francisco, USA.

Joachims, Thorsten, Making Large-Scale SVM Learning Practical, Jul. 9, 1998, pp. 41-56, MIT Press, Cambridge, USA.

Joachims, Thorsten, SVM Light Support Vector Machine, Feb. 9, 2004, pp. 1-14, Cornell University, USA.

Lewis, David D., Applying Support Vector Machines to the TREC-2001 Batch Filtering and Routing Tasks, 2002, 7 pages, www.david-dlewis.com, Chicago, USA.

Lewis, David D., RCV1-v2/LYRL2004: The LYRL2004 Distribution of the RCV1-v2 Text Categorization Test Collection, pp. 1-15, retrieved online Mar. 13, 2006, http://ww.ai.mit.edu/projects/jmlr/papers/volume5/lewis04a/lyrl2004_rcvlv2_README_2004_0404.htm, USA.

Lewis, David D. et al., RCV1: A New Benchmark Collection for Text Categorization Research, 2004, pp. 361-397, Journal of Machine Learning Research 5, USA.

Paige, Christopher C., Algorithm 583 LSQRI Sparse Linear Equations and Least Squares Problems, Jun. 1982, pp. 195-209, vol. 8, No. 2, ACM Transactions on Mathematical Software, USA.

Platt, John C., Fast Training of Support Vector Machines Using Sequential Minimal Optimization, Aug. 14, 2000, pp. 41-65, USA.

Yang, Yiming, A Study on Thresholding Strategies for Text Categorization, 2001, 9 pages, SIGIR'01, New Orleans, USA.

Freung, Yoav et al., Experiments with a New Boosting Algorithm, Machine Learning: Proceedings of the Thirteenth International Conference, 1996, pp. 1-9, USA.

\* cited by examiner

| | |
|---|---|
| Number of training examples | 23149 |
| Number of test examples | 781256 |
| Number of features | 47219 |
| Average Number of non-zero elements | 123.9 |

Figure 9

| Algorithms | Average micro-F1 | Average macro-F1 |
|---|---|---|
| PSVM | 0.767 | 0.354 |
| SVM light | 0.804 | 0.472 |
| WPSVM | 0.808 | 0.589 |
| SVM.2 | 0.810 | 0.557 |
| SVM.1 | 0.816 | 0.619 |

| Algorithms | | Average micro-F1 | Average macro-F1 |
|---|---|---|---|
| Industries (313) | SVM.1 | 0.513 | 0.297 |
| | WPSVM | 0.520 | 0.301 |
| Regions (228) | SVM.1 | 0.874 | 0.601 |
| | WPSVM | 0.862 | 0.558 |

Figure 12

| No. of training data | CCAT | | GDIP | |
|---|---|---|---|---|
| | WPSVM | SVM light | WPSVM | SVM light |
| 23149 | 1.6 | 43 | 2.1 | 9.1 |
| 222477 | 42.7 | 1313 | 35 | 317 |
| 421816 | 80.5 | 3306 | 100 | 884 |
| 621392 | 194.4 | 5110 | 171 | 1599 |
| 804414 | 273.4 | 10986 | 276 | 2458 |

Figure 13

TEXT CLASSIFICATION BY WEIGHTED PROXIMAL SUPPORT VECTOR MACHINE BASED ON POSITIVE AND NEGATIVE SAMPLE SIZES AND WEIGHTS

BACKGROUND

Automatic text classification involves first using some labeled documents to train a classifier and then using the classifier to predict the labels of unlabeled documents. Various methods have been proposed for performing automatic text classification. For example, SVM (Support Vector Machine), which is based on the statistical learning theory as discussed in Vapnik, V. N., *Statistical Learning Theory*. John Wiley & Sons, 1998, has been shown to be a good method for text classification problems as discussed in Lewis, D. D., *Applying support vector machines to the TREC-2001 batch filtering and routing tasks*, in the Tenth Text Retrieval Conference (TREC 2001), pages 286-292, Gaithersburg, Md. 20899-0001, 2002, National Institute of Standards and Technology; and Lewis, D. D., Yang, Y. Rose, T. and Li, F., *RCV1: A New Benchmark Collection for Text Categorization Research*, Journal of Machine Learning Research, 5:361-397, 2004. Research has been done to make SVM practical to classify relatively large-scale datasets as discussed in Joachims, T., *Making Large-Scale SVM Learning Practical*, Advances in Kernel Methods—Support Vector Learning, 1999; and Platt, J., *Fast Training of Support Vector Machines using Sequential Minimal Optimization*, Advances in Kernel Methods—Support Vector Learning, 1998.

BRIEF SUMMARY

This Brief Summary is provided to introduce a selection of concepts in a simplified form that are further described below in the Detailed Description. This Brief Summary is not intended to identify key features or essential features of the claimed subject matter, nor is it intended to be used as an aid in determining the scope of the claimed subject matter.

Embodiments of the invention are directed to classifying relatively large-scale text data with relatively high classification quality and relatively fast training speed. Embodiments of the invention are based on a novel extension of the proximal SVM mode as discussed in Fung, G. and Mangasarian, O. L., *Proximal Support Vector Machine Classifiers*, in Proc. of the Seventh ACM SIGKDD International Conference on Knowledge Discovery and Data Mining (KDD 2001), 2001. Previous studies on proximal SVM have focused on classification for relatively low dimensional data and typically did not consider the unbalanced data cases. Such methods will typically experience difficulties when classifying unbalanced and relatively high dimensional data sets, including, but not limited to, text documents. Embodiments of the invention extend the original proximal SVM model by learning a weight for each training error. Classification algorithms, which are based on this model in accordance with embodiments of the invention, are capable of handling relatively high dimensional and unbalanced data. In experiments, we have compared the weighted proximal SVM model with the original proximal SVM (as a special case embodiment of the weighted proximal SVM model) and the standard SVM model (such as SVM light) on the recently published RCV1-v2 dataset. The results of the experiment show that the weighted proximal SVM model had comparable classification quality with the standard SVM model. Meanwhile, both the time and memory consumption associated with the weighted proximal SVM model are less than those associated with the standard SVM model.

BRIEF DESCRIPTION OF THE DRAWINGS

The foregoing Brief Summary, as well as the following Detailed Description, is better understood when read in conjunction with the accompanying drawings, which are included by way of example, and not by way of limitation, with regard to the claimed invention.

DETAILED DESCRIPTION

I. Introduction

As discussed above, automatic text classification involves first using some labeled documents to train a classifier and then using the classifier to predict the labels of unlabeled documents. Various methods have been proposed for performing automatic text classification. For example, SVM (Support Vector Machine), which is based on the statistical learning theory as discussed in Vapnik, V. N., *Statistical Learning Theory*. John Wiley & Sons, 1998, has been shown to be a good method for text classification problems as discussed in Lewis, D. D., *Applying support vector machines to the TREC-2001 batch filtering and routing tasks*, in the Tenth Text Retrieval Conference (TREC 2001), pages 286-292, Gaithersburg, Md. 20899-0001, 2002, National Institute of Standards and Technology; and Lewis, D. D., Yang, Y. Rose, T. and Li, F., *RCV1: A New Benchmark Collection for Text Categorization Research*, Journal of Machine Learning Research, 5:361-397, 2004. Research has been done to make SVM practical to classify relatively large-scale datasets as discussed in Joachims, T., *Making Large-Scale SVM Learning Practical*, Advances in Kernel Methods—Support Vector Learning, 1999; and Platt, J., *Fast Training of Support Vector Machines using Sequential Minimal Optimization*, Advances in Kernel Methods—Support Vector Learning, 1998.

Embodiments of the invention advance the SVM classification model for relatively large-scale text data that are relatively unbalanced. In particular, when the text data is significantly unbalanced, that is, when the positive and negative labeled data is in disproportion, the classification quality of standard SVM deteriorates. Conventionally, this problem has been addressed using cross-validation based methods. But cross-validation methods are inefficient due to their tedious parameter adjustment routines.

Embodiments of the invention are directed to a weighted proximal SVM (WPSVM) model, in which the weights can be adjusted, to address the unbalanced data problem. Using a weighted proximal SVM model, we can achieve substantially the same accuracy as the traditional SVM model while requiring significantly less computational time.

A WPSVM model, in accordance with embodiments of the invention, can be thought of as an extended version of the proximal SVM (PSVM) model. The original proximal SVM was proposed in Fung, G. and Mangasarian, O. L., *Proximal Support Vector Machine Classifiers*, in Proc. of the Seventh ACM SIGKDD International Conference on Knowledge Discovery and Data Mining (KDD 2001), 2001. According to the experimental results set forth by Fung and Mangasarian, when classifying low dimensional data, training a proximal SVM is much faster than training a standard SVM, and the classification quality of proximal SVM is comparable to the standard SVM. However, the original proximal SVM is not suitable for text classification for the following two reasons: (1) text data is high dimensional data, but the method proposed by Fung and Mangasarian is not suitable for training high dimensional data; and (2) data is often unbalanced in text classification, but proximal SVM does not work well in this situation. Moreover, in our experiments, we found that the classification quality of proximal SVM deteriorates more quickly than standard SVM when the training data becomes unbalanced.

A weighted proximal SVM (WPSVM) model in accordance with embodiments of the invention may be successfully applied to classifying relatively high dimensional and relatively unbalanced text data through the introduction of the following two modifications: (1) in WPSVM, we added a weight for each training error and developed a relatively simple method to estimate the weights, which automatically solves the unbalanced data problem; and (2) instead of solving the problem by KKT (Karush-Kuhn-Tucker) conditions and Sherman-Morrison-Woodbury formula as shown in Fung and Mangasarian, we use an iterative algorithm to solve WPSVM, which makes WPSVM suitable for classifying relatively high dimensional data.

Experimental results on RCV1-v2 as discussed in Lewis, D. D., *RCV1-v2/LYRL2004: The LYRL2004 Distribution of the RCV1-v2 Text Categorization Test Collection* (12 Apr. 2004 Version); and Lewis, D. D., Yang, Y. Rose, T. and Li, F., *RCV1: A New Benchmark Collection for Text Categorization Research*, Journal of Machine Learning Research, 5:361-397, 2004, show that the classification quality of WPSVM are as accurate as traditional SVM and more accurate than proximal SVM when the data is unbalanced. Meanwhile, WPSVM is significantly more computationally efficient than traditional SVM.

II. Example Implementation of Training and Classification

Figure 1:
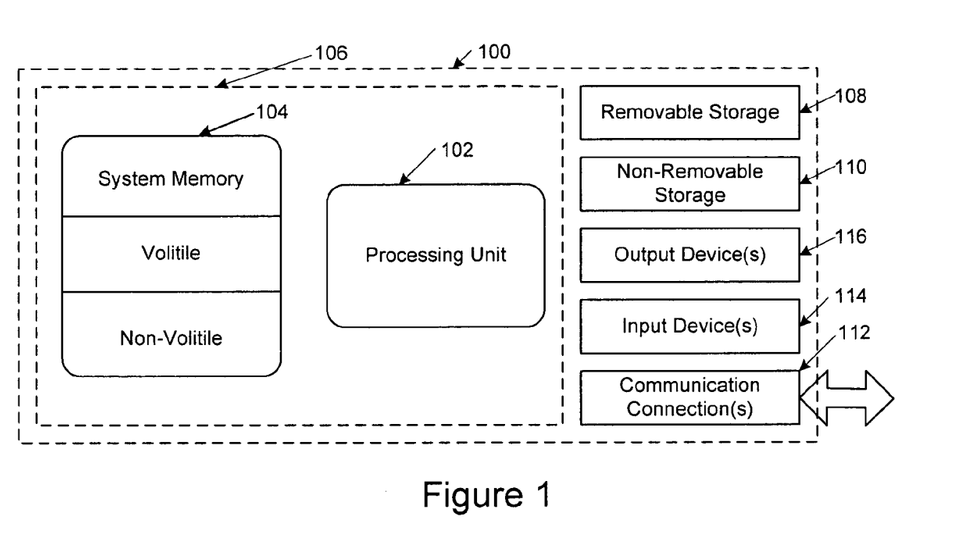
FIG. 1 shows an exemplary computer system within which embodiments of the invention may be implemented.

With reference to FIG. 1, an exemplary system for implementing embodiments of the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Figure 2:
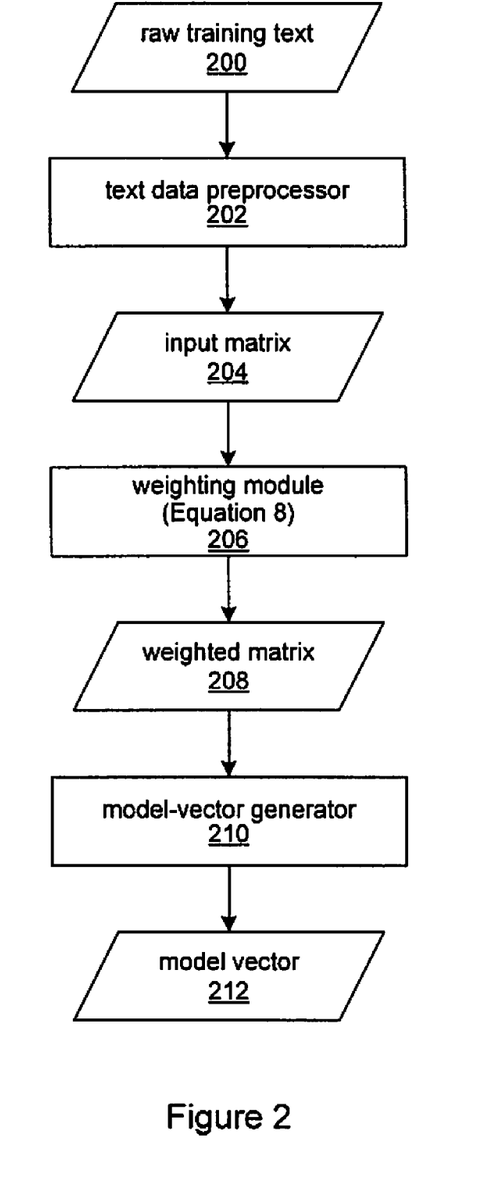
FIG. 2 is a data flow diagram for a system that trains a text classifier in accordance with embodiments of the invention.

FIG. 2 is a data flow diagram for a system that trains a text classifier in accordance with embodiments of the invention. The text data preprocessor 202 uses the Vector Space Model, as discussed in Baeza-Yates, R. and Ribeiro-Neto, B., *Modern Information Retrieval*, Addison Wesley, 1999, to represent the raw training text 200 and the corresponding labels as an input TF*IDF matrix 204. Sections III.A and IV below discuss how the input TF*IDF matrix 204 may be used for training and classification in accordance with embodiments of the invention. Weighting module 206 re-weights the input matrix 204 based on the number of positive and negative training examples. For a more detailed discussion regarding the functionality of the weighting module 206, please see section V.A below. Weighted matrix 208 is output by the weighting module 206 and input to the model-vector generator 210, which may solve an optimal equation using an iterative algorithm such as the CGLS algorithm, discussed in Paige C. C. and Saunders, M. A., *Algorithm 583; LSQR: Sparse linear equations and least-squares problems*, TOMS 8(2), 195-209, 1982, to generate the model vector 212. For a more detailed discussion regarding the functionality of the model-vector generator 210, please see sections IV and V.B below.

Figure 3:
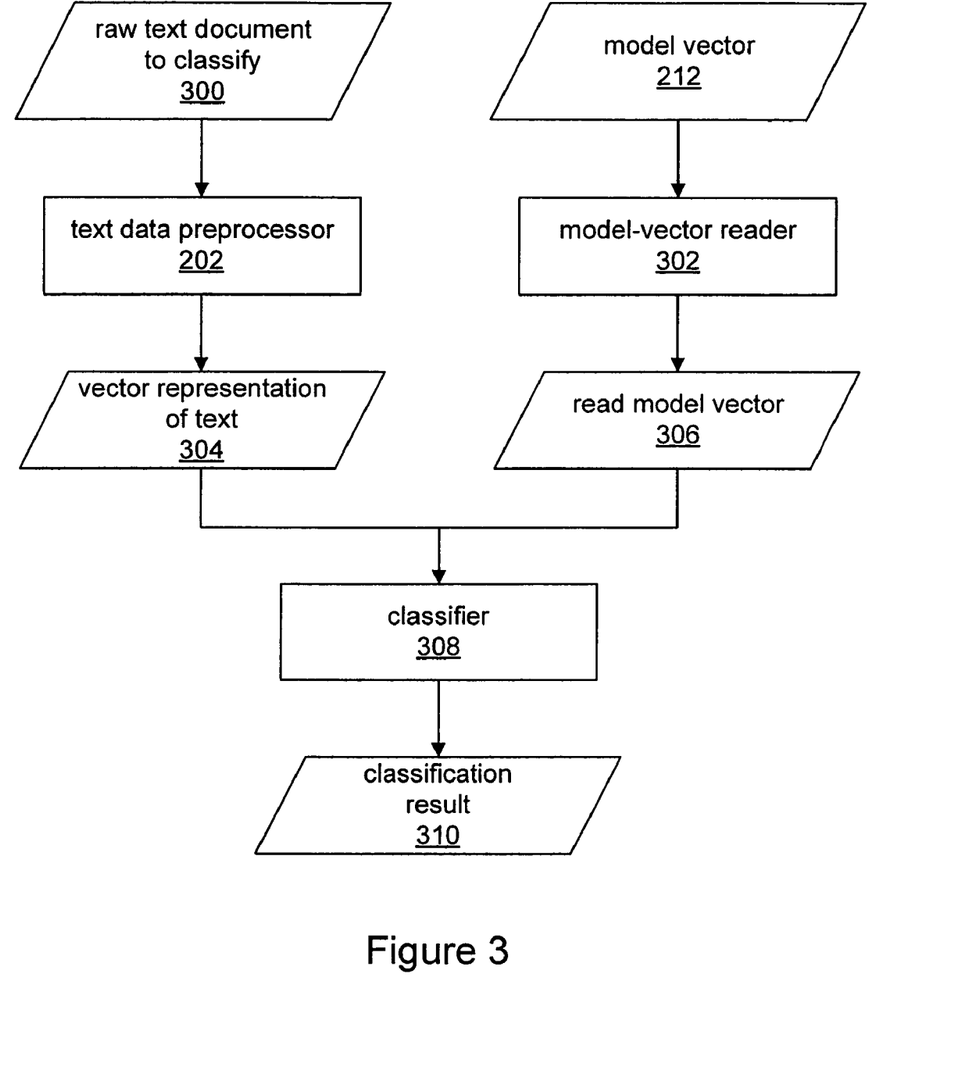
FIG. 3 is a data flow diagram for a system that performs text classification in accordance with embodiments of the invention.

FIG. 3 is a data flow diagram for a system that performs text classification in accordance with embodiments of the invention. The text data preprocessor 202 uses the Vector Space Model to represent the raw text to classify 300 as a vector 304. Sections III.A and IV below discuss how the input TF*IDF matrix 204 may be used for training and classification in accordance with embodiments of the invention. The model-vector reader 302 reads the model vector 212 generated during training and sends the read model vector 306 to the classifier 308. The vector representation of the text 304 and the read model vector 306 are input to the classifier 308, which calculates the inner product of the input vector 304 from the text data preprocessor 202 and the read model vector 306. The classifier 308 may output the classification result 310 as a label based on the calculated value as follows: if the value is greater than 0, +1 is output; otherwise, −1 is output.

Figure 4:
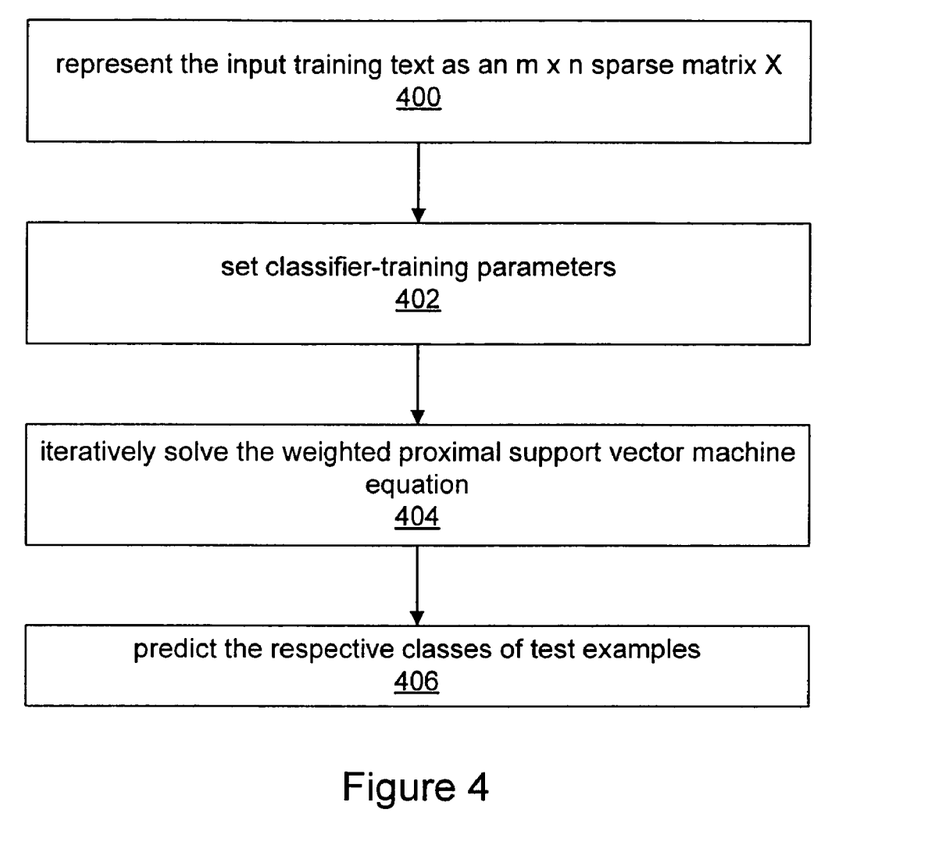
FIG. 4 is a flow diagram showing steps for training of a text classifier and for classifying text in accordance with embodiments of the invention.

FIG. 4 is a flow diagram showing steps for training of a text classifier and for classifying text in accordance with embodiments of the invention. As shown at 400, the input training text may be represented as an m×n sparse matrix X, where m is the number of training examples and n is the dimension of the training vector. Use $<x_i,y_i>$ to denote each training data, where $x_i \in R^n$, i=1, 2, . . . , m are training vectors and $y_i \in \{+1,-1\}$, i=1, 2, . . . m are their corresponding class labels.

As shown at 402, classifier-training parameters may be set. For example, N+ may denote the number of positive training examples and N− may denote the number of negative training examples and various parameters may be set as follows: Set $\delta_-=1$; Set ratio=$\sqrt{N_-/N_+}$; Set $\delta_+=1+(ratio-1)/2$; For positive training examples, set $\delta_i=\delta_+$; For negative training examples, set $\delta_i=\delta_-$; and Set $v=2*average(\delta_i\|x_i\|)$.

Let A=[X,e], where each element in vector e is 1. Let $\Delta \in R^{m \times m}$ denote a diagonal matrix whose non-zero elements are $\Delta_{ii}=\delta_i$. As shown at 404, equation $(vI+(\Delta A)^T(\Delta A))\beta=(\Delta A)^T(\Delta y)$ may be solved using the CGLS algorithm discussed in Paige C. C. and Saunders, M. A., *Algorithm 583; LSQR: Sparse linear equations and least-squares problems*, TOMS 8(2), 195-209, 1982.

As shown at 406, the sign of $\beta \cdot (x_i,1)$ may be used to predict the class of test example $x_i$.

III. Problem Definition and Related Work

A. Problem Definition

In our formulation, text documents are represented in the Vector Space Model as discussed in Baeza-Yates, R. and Ribeiro-Neto, B., *Modern Information Retrieval*, Addison Wesley, 1999. In this model, each document is represented by a vector of weighted term frequencies using the TF*IDF indexing schema, which is also discussed by Baeza-Yates and Ribeiro-Neto.

For simplicity, we first consider the binary classification problem, where there are two class labels in the training data: positive (+1) and negative (−1). Note that multi-class classification problems can be solved by combining multiple binary classifiers. Suppose that there are m documents and n terms in the training data, we use $<x_i,y_i>$ to denote each training data, where $x_i \in R^n$, i=1, 2, . . . , m are training vectors and $y_i \in \{+1,-1\}$, i=1, 2, . . . m are their corresponding class labels. The binary text classification problem can be formulated as follows:

Given a training dataset $\{<x_i,y_i>|x_i \in R^n, y_i \in \{-1,1\}\}$, i=1, 2 . . . m}, finding a classifier $f(x):R^n \rightarrow \{+1,-1\}$, such that for any unlabeled data x, we can predict the label of x by f(x).

Before discussing weighted proximal SVM in accordance with embodiments of the invention, we will review the standard SVM and proximal SVM. More detailed information about standard SVM and proximal SVM may be found in Burges, C., *A Tutorial on Support Vector Machine for Pattern Recognition*, Data Mining and Knowledge Discovery, 1998; and Fung, G. and Mangasarian, O. L., *Proximal Support Vector Machine Classifiers*, in Proc. of the Seventh ACM SIGKDD International Conference on Knowledge Discovery and Data Mining (KDD 2001), 2001.

In this document, we will follow the notations used by Burges, which notations may differ somewhat from those used by Fung and Mangasarian. A weighted proximal SVM model in accordance with embodiments of the invention may use a linear, or a non-linear, kernel. But there are no significant advantages to using a non-linear kernel for text classification.

B. Standard SVM Classifier

The standard SVM algorithm aims to find an optimal hyperplane w·x+b=0 and to use this hyperplane to separate the positive and negative data. Such a classifier can be written as:

$$f(x) = \begin{cases} +1, & \text{if } x \cdot w + b \geq 0 \\ -1, & \text{if } x \cdot w + b < 0 \end{cases}$$

The separating hyperplane is determined by two parameters w and b. The objective of the SVM training algorithm is to find w and b from the information in the training data. The standard SVM algorithm finds w and b by solving the following optimization problem.

$$\min \frac{1}{2}\|w\|^2 + C\sum_i \xi_i \quad (1)$$

$$\text{s.t. } \forall i, \; y_i(w \cdot x_i + b) + \xi_i \geq 1$$

$$\xi_i \geq 0$$

The first term $\|w\|^2$ controls the margin between the positive and negative data. $\xi_i$ represents the training error of the $i^{th}$ training example. Minimizing the objective function of formula (1) means minimizing the training errors and maximizing the margin simultaneously. C is a parameter that controls the tradeoff between the training errors and the margin.

Figure 5:
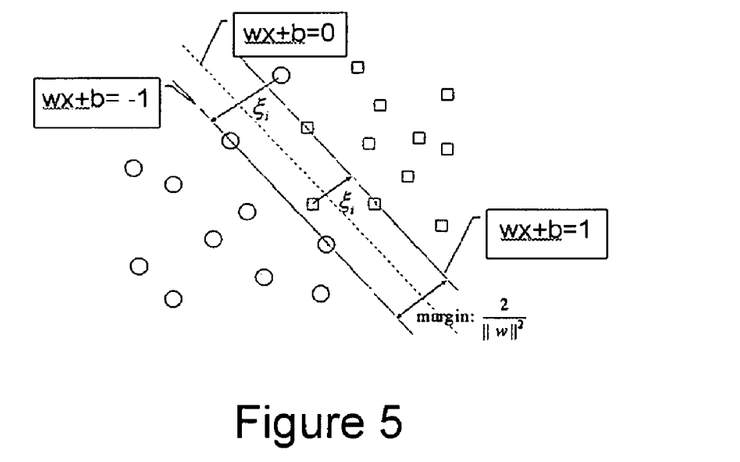
FIG. 5 shows the intuition of the standard support vector machine (SVM) model.

The intuition of standard SVM is shown in FIG. 5. $w \cdot x_i + b = 1$ and $w \cdot x_i + b = -1$ are two bounding planes. The distance between the two bounding planes is the margin. The optimization problem as expressed in formula (1) can be converted to a standard Quadratic Programming problem. Efficient methods have been proposed to solve this problem on relatively large scale data as discussed in Burges, C., *A Tutorial on Support Vector Machine for Pattern Recognition*, Data Mining and Knowledge Discovery, 1998; and Joachims, T., *Making Large-Scale SVM Learning Practical*, Advances in Kernel Methods—Support Vector Learning, 1999.

C. Proximal SVM Classifier

The proximal SVM also uses a hyperplane w·x+b=0 as the separating surface between positive and negative training examples. But the parameters w and b are determined by solving the following problem.

$$\min \frac{1}{2}(\|w\|^2 + b^2) + C\sum_i \xi_i^2 \quad (2)$$

$$\text{s.t. } \forall i, y_i(w \cdot x_i + b) + \xi_i = 1$$

Figure 6:
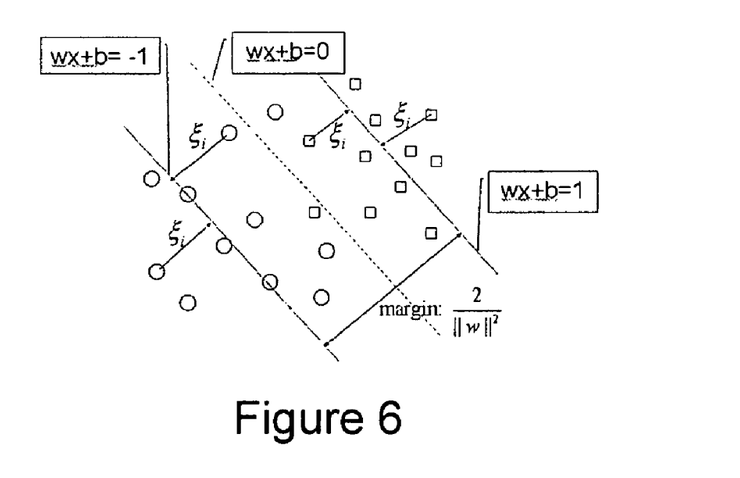
FIG. 6 shows the intuition of the proximal SVM (PSVM) model.

The main difference between standard SVM (1) and proximal SVM (2) is the constraints. Standard SVM employs an inequality constraint whereas proximal SVM employs an equality constraint. The intuition of Proximal SVM is shown in FIG. 6. We can see that standard SVM considers points on the wrong side of $w \cdot x_i + b = 1$ and $w \cdot x_i + b = -1$ as training errors. However, in proximal SVM, the points not located on the two planes are treated as training errors. In this case, the value of training error $\xi_i$ in (2) may be positive or negative. The second part of the objective function in (2) uses a squared loss function $$\sum_i \xi_i^2$$

instead of $$\sum_i \xi_i$$

to capture this new notion of error.

The proximal SVM made these modifications mainly for efficiency purposes. Fung and Mangasarian proposed an algorithm to solve (2) using KKT conditions and Sherman-Morrison-Woodbury formula. This algorithm is relatively fast and has comparable effectiveness with standard SVM when the data dimension is significantly less than the number of training data (n<<m). However, in text classification n usually has substantially the same magnitude with m such that the condition n<<m typically is not true. To the best of our knowledge, little previous research has been conducted to show the performance of proximal SVM with high dimensional data.

Although the original PSVM algorithm of Fung and Mangasarian is not suitable for high dimensional data, formula (2) can be solved relatively efficiently for high dimensional data using iterative methods. We have applied the proximal SVM model to text classification but found that when the data is unbalanced, i.e. when the amount of positive data is significantly more than negative data, or vice versa, the effectiveness of proximal SVM deteriorates more quickly than standard SVM. Data unbalance is relatively common in text classification, which means that an extension to proximal SVM that elegantly addresses this problem would be desirable.

IV. Weighted Proximal SVM Model

In this section, we discuss why the original proximal SVM is typically unsuitable for classifying unbalanced data. With respect to unbalanced data, without loss of generality, suppose the amount of positive data is much fewer than the negative data. In this case, the total accumulative errors of the negative data will be much higher than that of the positive data. Consequently, the bounding plane $w \cdot x_i + b = 1$ will shift away from the negative data to produce a larger margin at the price of increasing the positive errors. Since the positive data is rare, this action will lower the value of the objective function (2). Then the separating plane will be biased to the positive data, which results in a higher precision and a lower recall for the positive training data.

To solve this problem, we assign a non-negative weight $\delta_i$ to each training error $\xi_i$ and convert the optimization problem (2) to the following form:

$$\min \frac{1}{2} v(\|w\|^2 + b^2) + \frac{1}{2} \sum_i \delta_i^2 \xi_i^2 \quad (3)$$

$$\text{s.t. } \forall i, y_i(w \cdot x_i + b) + \xi_i = 1$$

The differences between (2) and (3) include: that formula (2) assumes the training errors $\xi_i$ are equally weighted, but in formula (3) we use a non-negative parameter $\delta_i$ to represent the weight of each training error $\xi_i$; and in formula (3), we let $v = 1/(2C)$ and move the tradeoff parameter C from $\sum_i \xi_i^2$ to $(\|w\|^2 + b^2)$ for notation simplicity in the later development of our solving method.

Though (3) can be solved using KKT conditions and Sherman-Morrison-Woodbury formula as shown in Fung and Mangasarian, this solving strategy is relatively inefficient for high dimensional data, including, but not limited to, text documents. Instead, we convert formula (3) to an unconstrained optimization problem that can be directly solved using iterative methods.

The constraint of formula (3) can be written as:

$$\xi_i^2 = (1 - y_i(w \cdot x_i + b))^2 = (y_i - (w \cdot x_i + b))^2 \quad (4)$$

Using formula (4) to substitute $\xi_i$ in the objective function of formula (3), we get an unconstrained optimal problem:

$$\min f(w, b) = \frac{1}{2} v(\|w\|^2 + b^2) + \frac{1}{2} \sum_i \delta_i^2 (y_i - (w \cdot x_i + b))^2 \quad (5)$$

For notation simplicity, let $X \in R^{m \times n}$ an denote the TF*IDF matrix of documents whose row vectors are $x_i$. Suppose e is a vector whose elements are all 1. Let $A = [X, e] \in R^{m \times (n+1)}$, $\beta = [w, b] \in R^{(n+1)}$, and let $\Delta \in R^{m \times m}$ denote a diagonal matrix whose non-zero elements are $\Delta_{ii} = \delta_i$, then (5) can be written as:

$$\min f(\beta) = \frac{1}{2} v \|\beta\|^2 + \frac{1}{2} \|\Delta(y - A\beta)\|^2 \quad (6)$$

The gradient of $f(\beta)$ is:

$$\nabla f(\beta) = v\beta - (\Delta A)^T (\Delta y - \Delta A \beta)$$

$$= (vI + (\Delta A)^T (\Delta A))\beta - (\Delta A)^T (\Delta y)$$

The Hessian matrix of $f(\beta)$ is:

$$H = vI + (\Delta A)^T (\Delta A)$$

Since $v > 0$ and the elements of $\Delta$ and A are non-negative, it can be proven that H is definitely positive. The solution of (6) is found when $\nabla f(\beta) = 0$, that is:

$$(vI + (\Delta A)^T (\Delta A))\beta = (\Delta A)^T (\Delta y) \quad (7)$$

Equation (7) can be generally written as (shift*I+A'A)x=A'b, where A is a high dimensional sparse matrix. The conjugate-gradient method for least squares systems (CGLS) algorithm discussed in Paige C. C. and Saunders, M. A., *Algorithm 583; LSQR: Sparse linear equations and least-squares problems*, TOMS 8(2), 195-209, 1982, is dedicated to efficiently solving such a problem.

V. Algorithm Design

There are two main concerns in the algorithm design: how to set various parameters and how to solve equation (7) efficiently. We will address these concerns in this section.

A. Parameter Tuning

A training algorithm in accordance with embodiments of the invention may be used for determining values for various parameters. Parameter v controls the tradeoff between maximizing the margin and minimizing the training errors. Parameters $\delta_i$=1, 2, ..., m control the relative error weights of each training example. To simplify the parameter setting for the unbalanced data problem, we set the error weight of positive training data to $\delta_+$ and negative training data to $\delta_-$. These three parameters, v, $\delta_+$, and $\delta_-$, may be determined by statistical estimation methods on the training data, such as LOO (Leave-One-Out cross-validation), k-fold cross validation, and the like.

As mentioned above, weighting module 206 may re-weight the input matrix 204 based on the number of positive and negative training examples. If we iteratively update the weights by the separating plane obtained from the previous round of training, we essentially obtain a boosting based method such as AdaBoost as discussed in Freund, Y. and Schapire, R, *Experiments with a New Boosting Algorithm*, Machine Learing: Proceedings of the Thirteenth International Conference (ICML 96), 199. However, a disadvantage of using these boosting based and cross-validation based methods is that the amount of training time is undesirably long for parameter estimation.

To obtain a more efficient method than the boosting based methods, we have developed a method that can estimate the parameters based on the training data. It can achieve comparable effectiveness as compared to algorithms that use standard SVM plus cross validation techniques. Our parameter estimation method is as follows.

To get a balanced accumulative error on both positive and negative data, it is better to have the following condition:

$$\sum_{y_i=1} \delta_+^2 \xi_i^2 = \sum_{y_i=1} \delta_-^2 \xi_i^2$$

If we assume the error $\xi_i$ of both positive and negative training data have the same expectation, we can get:

$$N_+ \delta_+^2 = \delta_-^2 N_- \quad (8)$$

where N+ is the number of positive training examples and N− is the number of negative training examples. Then we set the parameter $\delta_-$ and $\delta_+$ as follows: set $\delta_-$=1; set ratio=$\sqrt{N_-/N_+}$; and set $\delta_+$=1+(ratio−1)/2.

Notice that we do not set $\delta_+$=ratio to exactly satisfy Equation (8). Instead, we use a conservative setting strategy to make the precision of a minor class a little higher than recall. This strategy usually results in higher accuracy for unbalanced data.

Parameter v is set as follows.

$$v=2*\text{average}(\delta_i \|x_i\|)$$

When the data is exactly balanced (the number of positive examples is equal to the number of negative examples), this method will result in $\delta_-=\delta_+=1$ and make WPSVM equal to PSVM. Therefore, PSVM can be viewed as a special case of WPSVM.

To give an intuitive example of the differences between WPSVM and PSVM, we manually generated a balanced data set and an unbalanced dataset in a two dimensional space. Then we calculated the separating plane of WPSVM and PSVM respectively. The results are shown in FIGS. 7 and 8.

Figure 7:
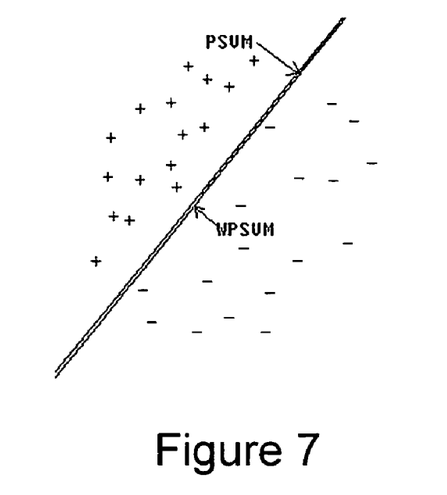
FIG. 7 shows the separating planes for PSVM and weighted PSVM (WPSVM) when the data is balanced.
Figure 8:
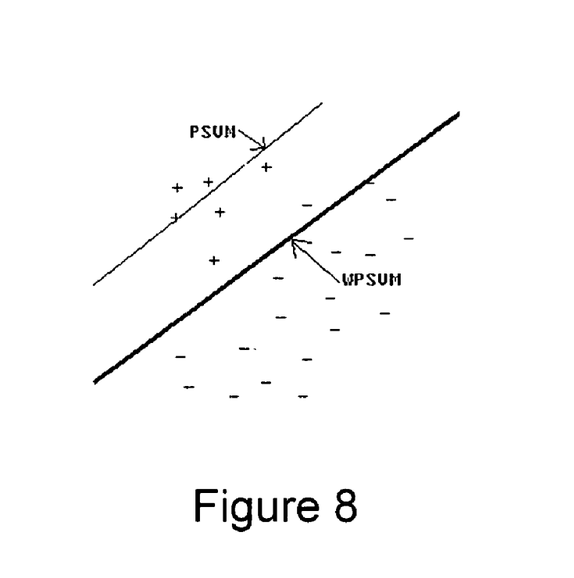
FIG. 8 shows the separating planes for PSVM and WPSVM when the data is unbalanced.

FIG. 7 shows that the separating planes for PSVM and WPSVM are almost the same when the data is balanced. FIG. 8 shows that when the data is unbalanced, the separating plane for WPSVM resides in the middle of the positive and negative examples, but the separating plane for PSVM is inclined to the positive examples.

B. Training Algorithms

As mentioned above, weighted matrix 208 is output by the weighting module 206 and input to the model-vector generator 210, which may solve an optimal equation using an iterative algorithm such as the CGLS algorithm. We tried several methods to solve equation (7) and found that CGLS as discussed in Paige C. C. and Saunders, M. A., *Algorithm 583; LSQR: Sparse linear equations and least-squares problems*, TOMS 8(2), 195-209, 1982, performed well. However, many other iterative optimal methods may also be used to solve Equation (7). Such methods are discussed in Iterative Methods for Sparse Linear Systems, 2nd edition. By Y. Saad, published by Society for Industrial and Applied Mathematics.

The complexity of the training algorithm is dominated by the algorithm used for solving Equation (7). Usually this kind of algorithm has O(KZ) time complexity and O(Z) space complexity where K is the number of iterations and Z is the number of non-zero elements in the training vectors.

Iterative methods find an approximate solution to the problem. The greater the number of iterations used, the longer the training time and the more closely that the iterative solution approximates the optimal solution. However, when the iteration count achieves a certain number, the classification result will not change as the number of iterations continues to increase. Therefore, it is desirable to select a good terminating condition to obtain a better tradeoff between training time and classification accuracy. Since the number of required iterations may vary for different datasets, we make the terminating condition an adjustable parameter when implementing the WPSVM algorithm.

VI. Experiments

A. Rationale

Our experiments evaluated the relative merits of WPSVM and other SVM based methods. Our experiments were directed to verifying the following hypotheses for text datasets: (1) WPSVM (with default parameter settings) has substantially the same classification power as standard SVM plus cross-validation, has slightly better classification power than standard SVM (with default parameter settings) and has significantly better classification power than PSVM; and (2) WPSVM is significantly more efficient than standard SVM

B. Data sets

The dataset that we chose is a textual dataset RCV1-v2 as discussed in Lewis, D. D., Yang, Y. Rose, T. and Li, F., *RCV1: A New Benchmark Collection for Text Categorization Research*, Journal of Machine Learning Research, 5:361-397, 2004. RCV1 (Reuters Corpus Volume I) is an archive of over 800,000 manually categorized newswire stories recently made available by Reuters, Ltd. for research purposes. Lewis, et al. made some corrections to the RCV1 dataset, and the resulting new dataset is called RCV1-v2.

The RCV1-v2 dataset contains a total of 804,414 documents. The benchmark results of SVM, weighted k-NN and Rocchio-style algorithms on RCV1-v2 are reported in Lewis, et al. The results show that SVM is the best method on this dataset. To make our experimental results comparable with the benchmark results, we strictly followed the instructions of Lewis, et al. That is, we used the same vector files, training/test split, and effective measures as in Lewis, et al.

C. Text Data Representation

The feature vector for a document was produced from the concatenation of text in the <headline> and <text> tags. After tokenization, stemming, and stop-word removal, 47,219 terms that appear in the training data are used as features. The features are weighted using the TF*IDF indexing schema and then are cosine normalized. The resulting vectors are published at Lewis, D. D., *RCV1-v2/LYRL2004: The LYRL2004 Distribution of the RCV1-v2 Text Categorization Test Collection* (12 Apr. 2004 Version). We used these vectors directly for our experiments.

D. Training/Test Split

The training/test split was done according to the publishing date of the documents. Documents published from Aug. 20, 1996, to Aug. 31, 1996, were treated as training data. Documents published from Sep. 1, 1996, to Aug. 19, 1997, were treated as test data. This split produced 23,149 training documents and 781,256 test documents.

E. Categories and Effective Measures

Each document may be assigned labels according to three different category sets: Topics, Industries, and Regions. For each category, the one-to-rest strategy was used in the experiments. In other words, when classifying category X, the examples labeled X are defined as positive examples, and the other examples are defined as negative examples.

The F1 measure is used to evaluate the classification quality of different methods. F1 is determined by Precision and Recall. The Precision, Recall, and F1 measures for a single category are defined as follows.

$$\text{Precision} = \frac{\text{\# of correctly classified positive examples}}{\text{\# of classifier predicted positive examples}}$$

$$\text{Recall} = \frac{\text{\# of correctly classified positive examples}}{\text{\# of real positive examples}}$$

$$F1 = (2*\text{Precision}*\text{Recall})/(\text{Precision}+\text{Recall})$$

The average effectiveness was measured by the average micro-F1 and average macro-F1. Average macro-F1 is the average value of each single F1 in the category set. Average micro-F1 is defined as follows.

$$microP = \frac{\sum_i \text{\# of correctly predicted docs for category } i}{\sum_i \text{\# of docs that are predicted as category } i}$$

$$microR = \frac{\sum_i \text{\# of correctly predicted docs for category } i}{\sum_i \text{\# of docs that truely belong to category } i}$$

$$Ave\ micro\text{-}F1 = (2*microP*microR)/(microP+microR)$$

F. Experiments on WPSVM's Effectiveness

In the effectiveness testing experiments, we compared the F1 measure on the following:

WPSVM: Our proposed algorithm, using the parameter estimating method discussed above in section IV.A.

PSVM: Set all $\delta_i$ in WPSVM model equal to 1 and make it equivalent to the proximal SVM algorithm.

SVM light: Using SVM light v 6.01 as discussed in Joachims T., SVM Light: Support Vector Machine. Feb. 9, 2004, with default parameter settings.

SVM.1: This algorithm is a standard SVM plus threshold adjustment. It is a benchmark method used in Lewis, D. D., Yang, Y. Rose, T. and Li, F., *RCV1: A New Benchmark Collection for Text Categorization Research*, Journal of Machine Learning Research, 5:361-397, 2004. In this algorithm, SVM light was run using default parameter settings and was used to produce the score. The threshold was calculated by the SCutFBR.1 algorithm as discussed in Yang Y., *A study on thresholding strategies for text categorization*, in the Twenty-Fourth Annual International ACM SIGIR Conference on Research and Development in Information Retrieval (SIGIR 01), 2001.

Figure 9:
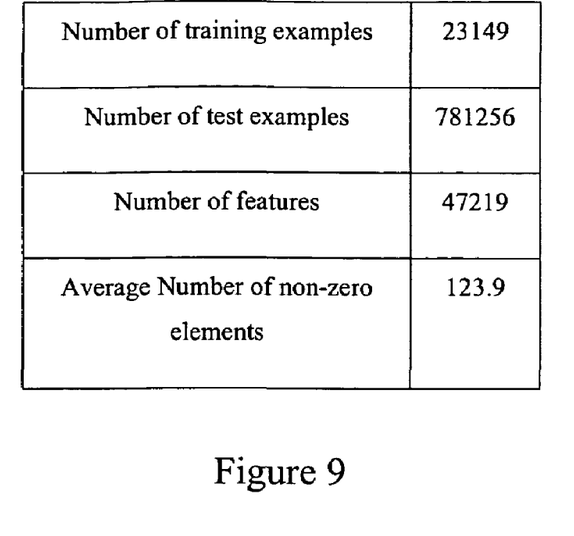
FIG. 9 is a table that shows the dataset scale for each category of a standard SVM plus Leave-One-Out cross-validation algorithm.

SVM.2: This algorithm is a standard SVM plus LOO cross validation. It was first introduced in Lewis, D. D., *Applying support vector machines to the TREC*-2001 *batch filtering and routing tasks*, in The Tenth Text REtrieval Conference (TREC 2001), pages 286-292, Gaithersburg, Md. 20899-0001, 2002, National Institute of Standards and Technology and named as SVM.2 in Lewis, D. D., Yang, Y. Rose, T. and Li, F., *RCV1: A New Benchmark Collection for Text Categorization Research*, Journal of Machine Learning Research, 5:361-397, 2004. In this algorithm, SVM light was run multiple times with deferent –j parameters and the best –j parameter was selected by LOO validation. The –j parameter controls the relative weighting of positive to negative examples. This approach solved the data unbalance situation by selecting the best –j parameter. The experiments were separately performed on each category using the one-to-rest strategy. The dataset scale for each category is shown in FIG. 9.

Figure 10:
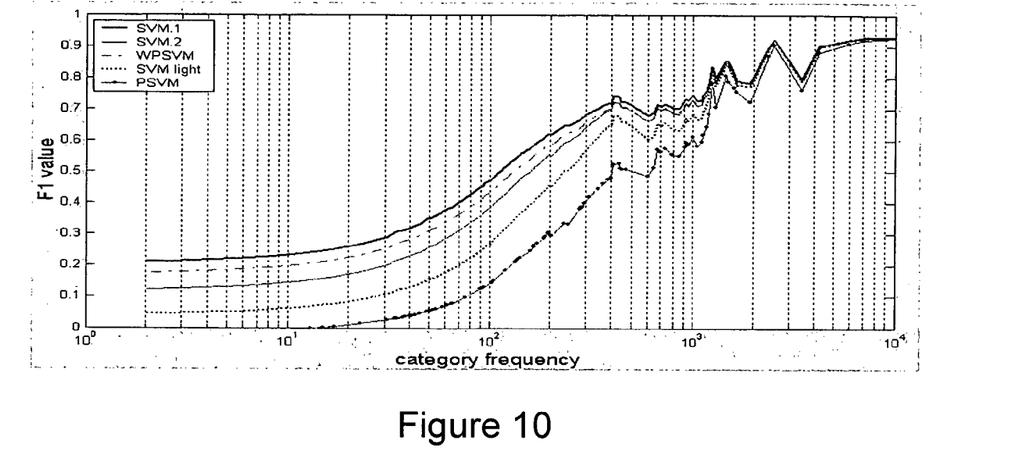
FIG. 10 shows the changes of F1 value from unbalanced data to balanced data for various algorithms.

We first introduce the results on the Topics categories. There are total 101 Topics categories for which at least one positive example appears in the training data. We calculate the F1 value for the five algorithms on each category (The F1 value of SVM.1 and SVM.2 is calculated by the contingency table published at Lewis, D. D., *RCV1-v2/LYRL2004: The LYRL2004 Distribution of the RCV1-v2 Text Categorization Test Collection* (12 Apr. 2004 Version)). FIG. 10 shows the changes of F1 value from unbalanced data to balanced data for the five algorithms. Categories are sorted by training set frequency, which is shown on the x-axis. The F1 value for a category with frequency x has been smoothed by replacing it with the output of a local linear regression over the interval x−200 to x+200.

From the results we can see that when the training data is relatively balanced (i.e., the right part FIG. 10), the F1 measure for the five algorithms has no significant differences. When the training data is unbalanced (i.e., the left part of FIG. 10), the classification quality of WPSVM is between SVM.1 and SVM.2. Both have better classification quality than SVM light and PSVM. FIG. 10 also shows the classification quality of PSVM deteriorates more quickly than that of SVM light when the data becomes unbalanced.

Figure 11:
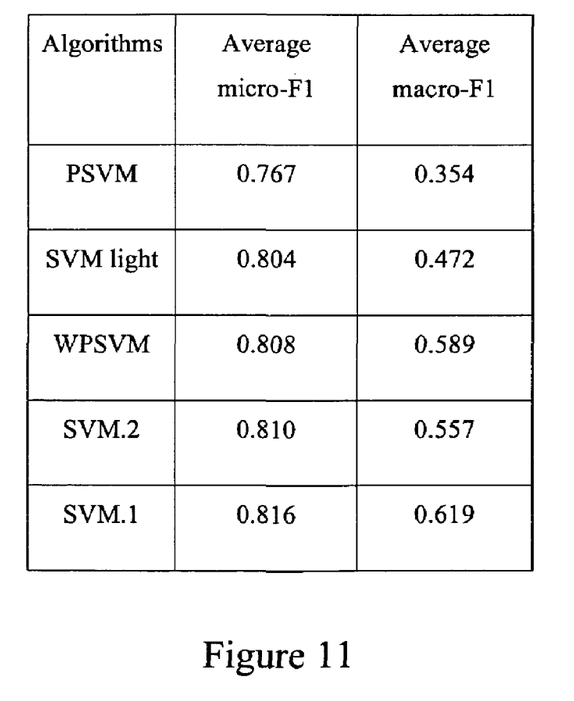
FIG. 11 is a table that shows the average F1 measure for various categories.

FIG. 11 is a table that shows the average F1 measure of the 101 categories. The results of SVM.1 and SVM.2 are the values reported in Lewis, D. D., Yang, Y. Rose, T. and Li, F., *RCV1: A New Benchmark Collection for Text Categorization Research*, Journal of Machine Learning Research, 5:361-397, 2004. It can be seen that the overall performance of WPSVM, SVM.1 and SVM.2 are better than that of SVM light and PSVM. SVM.1 has the best average effectiveness, especially in average macro-F1. This is mainly because when the training data is extremely unbalanced (e.g. the positive ratio is less than 0.1%), the threshold adjustment method is better than both WPSVM and SVM.2.

Figure 12:
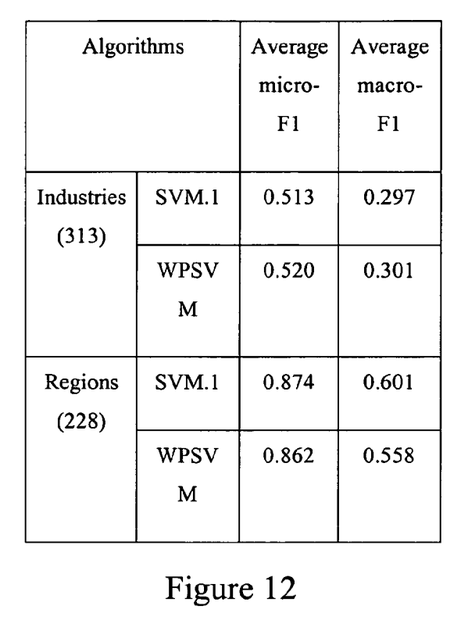
FIG. 12 is a table that shows the F1 measures of various categories.

We also tested the effectiveness of WPSVM on the 313 Industries categories and the 228 Regions categories. The average F1 measures of these categories are shown in FIG. 12. The results of SVM.1 shown in FIG. 12 are the values reported in Lewis, D. D., Yang, Y. Rose, T. and Li, F., *RCV1: A New Benchmark Collection for Text Categorization Research.*, Journal of Machine Learning Research, 5:361-397, 2004. We can see that in the Industries and Regions Split, the effectiveness of WPSVM is also comparable with SVM.1.

The effectiveness experiments show the overall classification quality of WPSVM is comparable with SVM.1 and SVM.2, which are the best methods of Lewis, et al., and is better than SVM light and PSVM. However, SVM.1 and SVM.2 require training many times to estimate a good parameter whereas WPSVM may be trained once.

G. Experiments on Computational Efficiency

The computational efficiency is measured by the actual training time and memory usage, respectively. Since SVM.1 and SVM.2 require running SVM light many times, their efficiency is less than SVM light. Thus in the experiments, we compared the efficiency of WPSVM and SVM light. We ran each algorithm on 5 training datasets with different sizes. The vector files of Lewis, et al. are published as one training file and 4 test files. We used the training file as the first dataset and then incrementally appended the remaining four test files to form the other four datasets. The number of training examples for the 5 datasets is 23149, 222477, 421816, 621392, and 804414, respectively. The training time is measured in seconds. Both algorithms ran on an Intel Pentium 4 Xeon 3.06G computer.

We found that when using SVM light for the same training size, balanced data required more training time than the unbalanced data. Thus, we did two groups of efficiency experiments. One group uses category CCAT as positive examples. The ratio of CCAT is 47.4%, and it makes this group a balanced example. The other group is an unbalanced example. It uses GDIP as positive examples. The ratio of GDIP is 4.7%.

Figure 13:
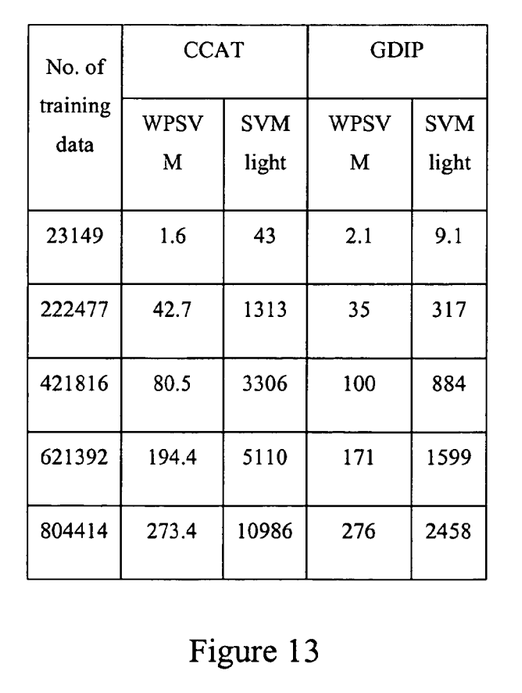
FIG. 13 shows the training time of WPSVM and SVM light.

FIG. 13 shows the training time of WPSVM and SVM light V6.01 on the two groups. We can see that the training time of WPSVM is far less than the training time of SVM light and is not affected by the unbalanced-data problem.

Figure 14:
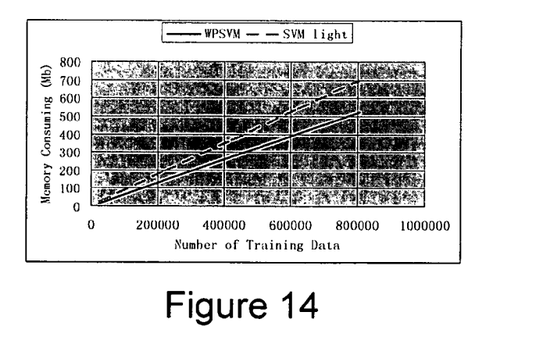
FIG. 14 shows the memory usage requirements both WPSVM and SVM light with different training sizes.

The memory usage required for both WPSVM and SVM light is determined by the training size, regardless of whether the data is balanced or unbalanced. FIG. 14 shows the memory requirements of the two algorithms with different training sizes. We can see that the memory requirement of WPSVM is slightly less than SVM light. This is because WPSVM uses substantially no more memory than the memory used to store the training data. But SVM light requires additional working space.

VII. Concluding Remarks

The effectiveness of the weighted proximal support vector machine (WPSVM) model was discussed above in the context of text classification. Nevertheless, as a general linear SVM classification model, WPSVM may also be used for other classification tasks. The WPSVM model may have other potential uses in addition to solving the unbalanced data problem. For example, in WPSVM, the relative importance of each training point may be adjusted based on other prior knowledge.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for training a text classifier, the system comprising:
   a memory storing computer-executable instructions that implement:
      a text data preprocessor that preprocesses raw training text to produce an input matrix, the raw training text including documents and indications of whether each document is a positive or a negative training example of a classification; and
      a module for solving a weighted proximal support vector machine equation comprising:
         a weighting module that generates a weighted matrix by re-weighting the input matrix based on how many training examples are positive and how many training examples are negative wherein the weighting is based on satisfying the following equation:

$$N_+ \delta_+^2 = N_- \delta_-^2$$

where $N_+$ and $N_-$ denote numbers of positive and negative training examples and $\delta_+$ and $\delta_-$ denote weights of the positive and negative training examples; and
      a model-vector generator that iteratively calculates a model vector based on the weighted matrix using a proximal support vector machine model; and
   a processor for executing the computer-executable instructions stored in the memory.

2. The system of claim 1, wherein the text data preprocessor uses a vector space model to represent the raw training text.

3. The system of claim 2, wherein the text data preprocessor uses the vector space model to represent labels that correspond to the raw training text.

4. The system of claim 1, wherein the iterative algorithm is a conjugate-gradient method for least squares systems algorithm.

5. A system for classifying text, the system comprising:
   a memory storing computer-executable instructions that implement:
      a text data preprocessor that preprocesses raw text to be classified to produce a vector representation of the text, the raw training text including documents and indications of whether each document is a positive or a negative training example of a classification;
      a model-vector reader that reads a model vector, the model vector being generated by solving a weighted proximal support vector machine equation by
         generating a weighted matrix by re-weighting the input matrix based on how many training examples are positive and how many training examples are negative wherein the weighting is based on satisfying the following equation:

$$N_+ \delta_+^2 = N_- \delta_-^2$$

where $N_+$ and $N_-$ denote numbers of positive and negative training examples and $\delta_+$ and $\delta_-$ denote weights of the positive and negative training examples; and iteratively calculating a model vector based on the weighted matrix using a proximal support vector machine model; and a classifier that generates a classification result based on the vector representation of the text and based on the read model vector; and a processor for executing the computer-executable instructions stored in the memory.

6. The system of claim 5, wherein the text data preprocessor uses a vector space model to represent the raw text to be classified.

7. The system of claim 6, wherein the classifier calculates an inner product of the vector representation of the text and the read model vector.

8. The system of claim 7, wherein the classification result is based on the calculated inner product.

9. The system of claim 8, wherein: if the calculated inner product is greater than 0, the classification result is +1; and if the calculated inner product is less than or equal to 0, the classification result is −1.

10. A computer-readable medium containing computer-executable instructions for training a text classifier and classifying text by performing steps comprising:

representing input training text as a sparse matrix, the raw training text including documents and indications of whether each document is a positive or a negative training example of a classification;

setting a plurality of classifier-training parameters;

iteratively solving a weighted proximal support vector machine equation by generating a weighted matrix by re-weighting the input matrix based on how many training examples are positive and how many training examples are negative wherein the weighting is based on satisfying the following equation:

$N_+\delta_+^2 = N_-\delta_-^2$ where $N_+$ and $N_-$ denote numbers of positive and negative training examples and $\delta_+$ and $\delta_-$ denote weights of the positive and negative training examples; and iteratively calculating a model vector based on the weighted matrix using a proximal support vector machine model; and predicting respective classes for a plurality of test examples.

11. The computer-readable medium of claim 10, wherein the sparse matrix is an m by n sparse matrix X, where m is a number of training examples and n is a dimension of a training vector.

12. The computer-readable medium of claim 11, containing further computer-executable instruction for performing steps comprising: using $<x_1, y_1>$ to represent each training data sample, where $x_i \epsilon R^n$, i=1, 2, ..., m are training vectors and $y_i \epsilon \{+1,-1\}$, i=1, 2, ..., m are their corresponding class labels.

13. The computer-readable medium of claim 12, wherein setting the classifier-training parameters includes setting $\delta_- = 1$.

14. The computer-readable medium of claim 13, wherein setting the classifier-training parameters includes setting ratio=$\sqrt{N_-/N_+}$, where $N_+$ denotes a number of positive training examples and $N_-$ denotes a number of negative training examples.

15. The computer-readable medium of claim 14, wherein setting the classifier-training parameters includes setting $\delta_+ = 1+(\text{ratio}-1)/2$.

16. The computer-readable medium of claim 15, wherein setting the classifier-training parameters includes setting $\delta_i = \delta_+$ for positive training examples.

17. The computer-readable medium of claim 16, wherein setting the classifier-training parameters includes setting $\delta_i = \delta_-$ for negative training examples.

18. The computer-readable medium of claim 17, wherein setting the classifier-training parameters includes setting $v = 2*\text{average}(\delta_i \|x_i\|)$.

19. The computer-readable medium of claim 18, wherein iteratively solving the weighted proximal support vector machine equation includes:

A=[X,e], where each element in vector e is 1;

letting $\Delta \epsilon R^{m \times m}$ denote a diagonal matrix whose non-zero elements are $\Delta_{ii} = \delta_i$ and solving $(vI+(\Delta A)^T(\Delta A))\beta = (\Delta A)^T(\Delta y)$ using a conjugate-gradient method for least squares systems algorithm.

20. The computer-readable medium of claim 19, wherein predicting the respective classes for the plurality of test examples includes predicting the class of test example $X_i$ based on whether $\beta \cdot (x_i, 1)$ is positive or negative.

* * * * *